US012517904B2

(12) United States Patent
Cruanes et al.

(10) Patent No.: US 12,517,904 B2
(45) Date of Patent: Jan. 6, 2026

(54) DYNAMIC CHANGES TO COMPILATION BASED ON QUERY PROPERTIES

(71) Applicant: Snowflake Inc., Bozeman, MT (US)

(72) Inventors: Thierry Cruanes, San Mateo, CA (US); Kavinder S. Dhaliwal, San Carlos, CA (US); Jaeyun Noh, Sunnyvale, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 38 days.

(21) Appl. No.: 18/329,915

(22) Filed: Jun. 6, 2023

(65) Prior Publication Data

US 2024/0168950 A1 May 23, 2024

Related U.S. Application Data

(60) Provisional application No. 63/427,485, filed on Nov. 23, 2022.

(51) Int. Cl.
*G06F 16/20* (2019.01)
*G06F 16/2453* (2019.01)
*G06F 16/2455* (2019.01)

(52) U.S. Cl.
CPC .. *G06F 16/24542* (2019.01); *G06F 16/24564* (2019.01)

(58) Field of Classification Search
CPC ............... G06F 16/24542; G06F 16/24564
USPC ........................................................ 707/718
See application file for complete search history.

(56) References Cited

U.S. PATENT DOCUMENTS

2021/0019319 A1* 1/2021 Vogelsgesang ... G06F 16/24539

OTHER PUBLICATIONS

"International Application Serial No. PCT US2023 079744, International Search Report mailed Apr. 4, 2024", 2 pages.
"International Application Serial No. PCT US2023 079744, Written Opinion mailed Apr. 4, 2024", 6 pages.

* cited by examiner

*Primary Examiner* — Belix M Ortiz Ditren
(74) *Attorney, Agent, or Firm* — Schwegman Lundberg & Woessner, P.A.

(57) ABSTRACT

Techniques for reducing query compilation time are described. Dynamic compilation behavior based on query properties can reduce time and computational costs. For example, the techniques can identify stages and rewrite rules to skip or modify in the compilation process based on, among other things, properties of the parse tree and the query plan.

18 Claims, 12 Drawing Sheets

DYNAMIC CHANGES TO COMPILATION BASED ON QUERY PROPERTIES

CROSS-REFERENCE TO RELATED APPLICATION

This application claims the benefit of priority to U.S. Provisional Patent Application Ser. No. 63/427,485 filed Nov. 23, 2022, the contents of which are incorporated herein by reference in its entirety.

TECHNICAL FIELD

The present disclosure generally relates to data systems, and, more specifically, query compilation.

BACKGROUND

As the world becomes more data driven, database systems and other data systems are storing more and more data. For a business to use this data, different operations or queries are typically run on this large amount of data. Executing queries over large amounts of data can involve long processing times.

Query optimization can help with improving query processing, but sometimes it can actually increase query processing time by performing unnecessary optimization steps.

BRIEF DESCRIPTION OF THE DRAWINGS

Various ones of the appended drawings merely illustrate example embodiments of the present disclosure and should not be considered as limiting its scope.

DETAILED DESCRIPTION

Techniques for reducing query compilation time are described herein. Dynamic compilation behavior based on query properties can reduce time and computational costs. The techniques can identify stages and rewrite rules to skip or modify in the compilation process based on, among other things, properties of the parse tree and the query plan. These techniques can be used in compilation of different types of queries, including hybrid transaction/analytical processing (HTAP) queries evaluating an equality/range predicate on a table, for example.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
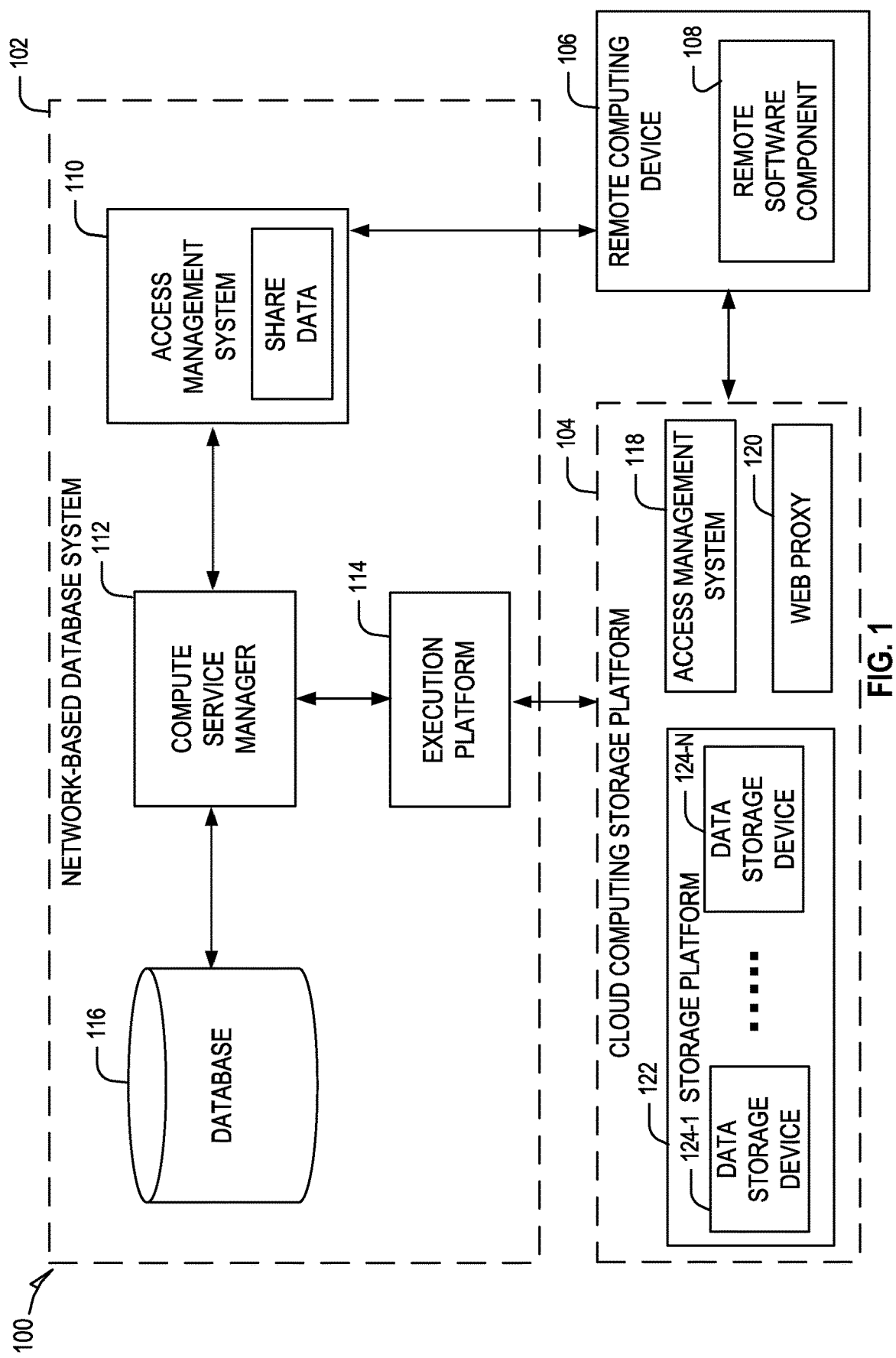
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform (also referred to as XP) 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
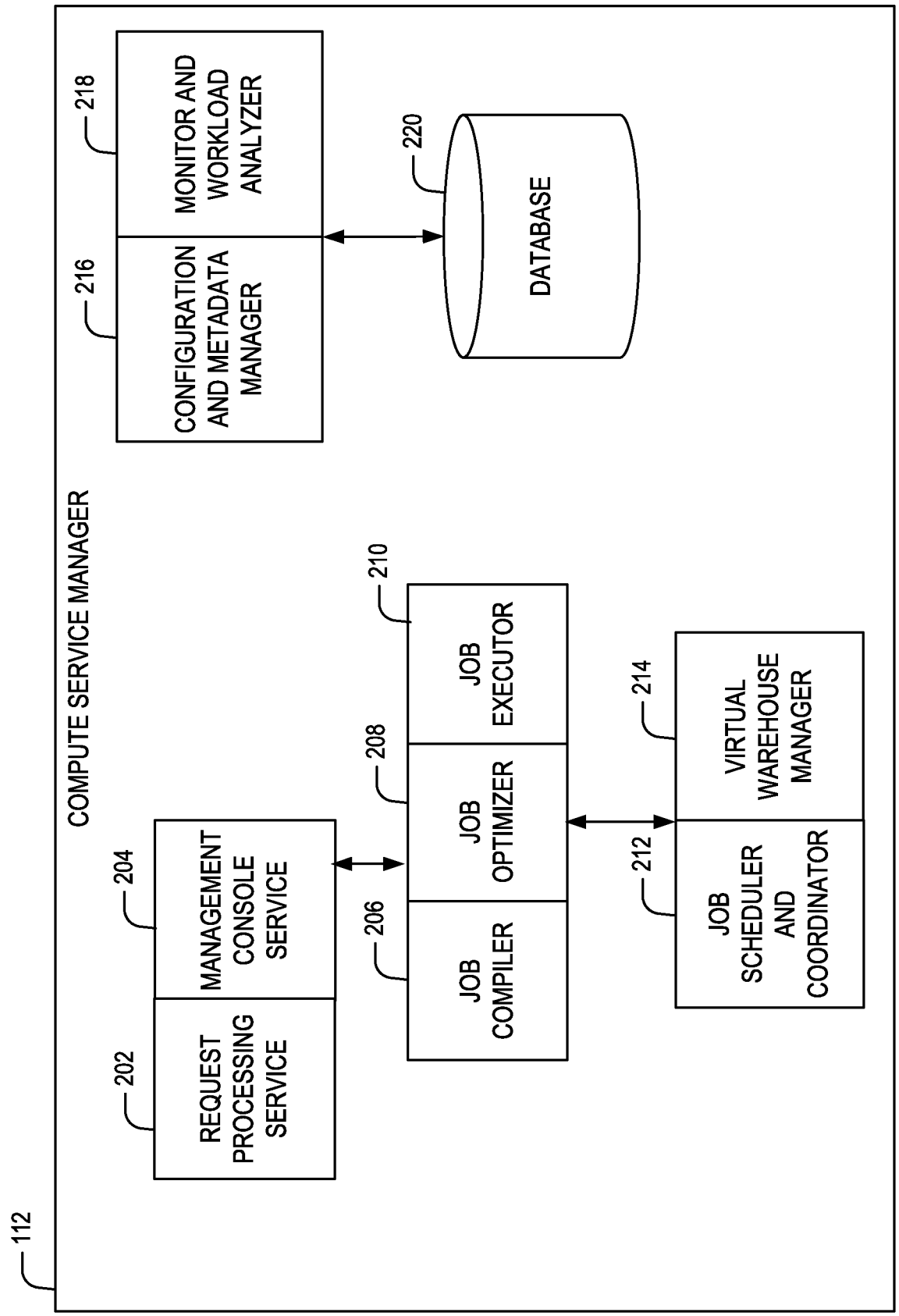
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based database system 102. For example, data storage device 220 may represent caches in execution platform 114, storage devices in cloud computing storage platform 104, or any other storage device.

Figure 3:
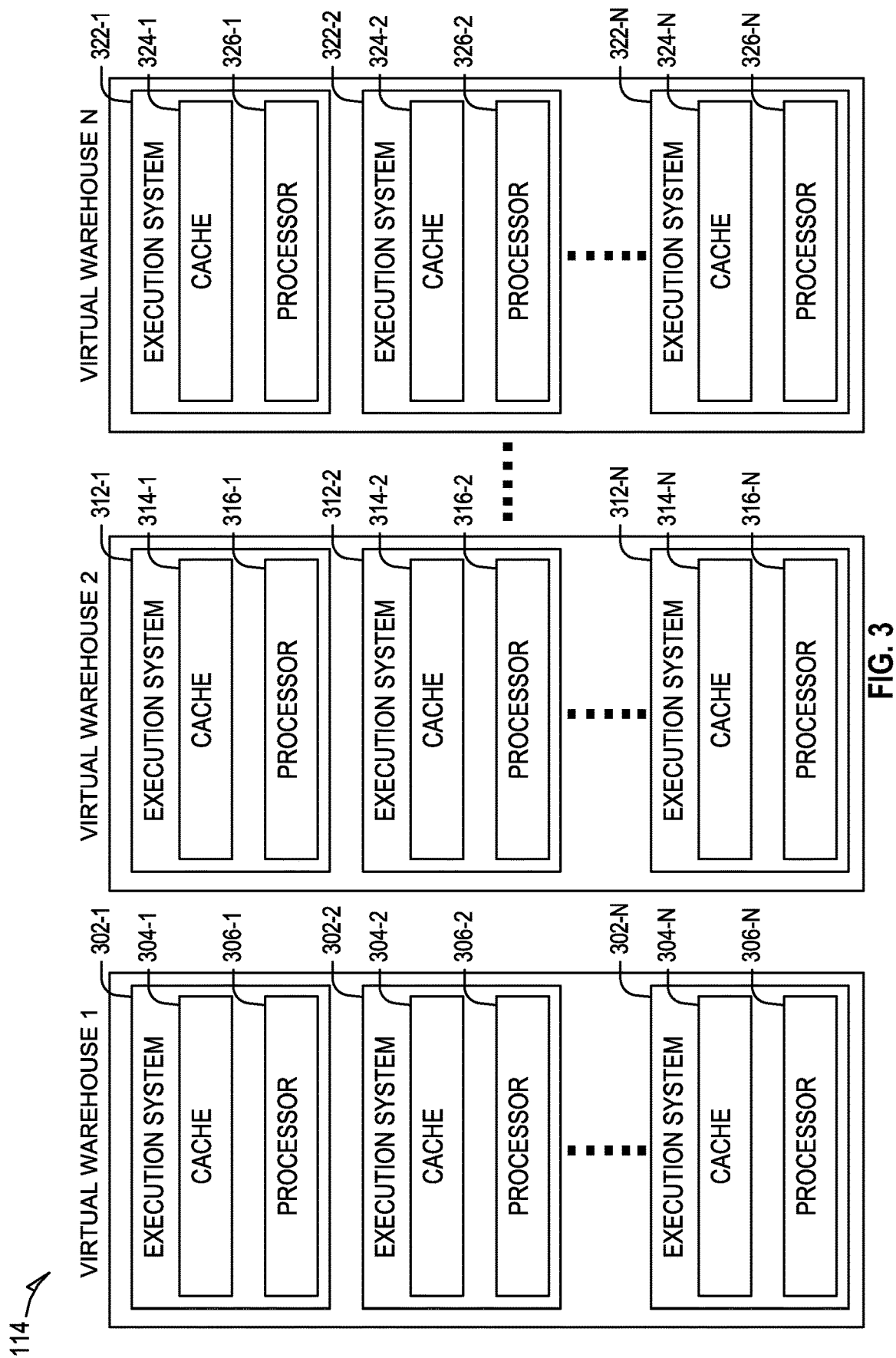
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Query compilation can include parsing, type check, optimization, and code generation. Query compilation typically involves receiving, by a compute service manager, a query, such as a SQL (Structured Query Language) statement, and generating a query execution plan, such as a JSON representation of the execution plan, which can then be executed by one or more XPs. The query execution plan can include a representation of an execution graph where nodes describe operations for execution. To generate this form of a query execution plan, query compilation can include a plurality of stages and rewrite rules to produce optimized execution plans.

Figure 4:
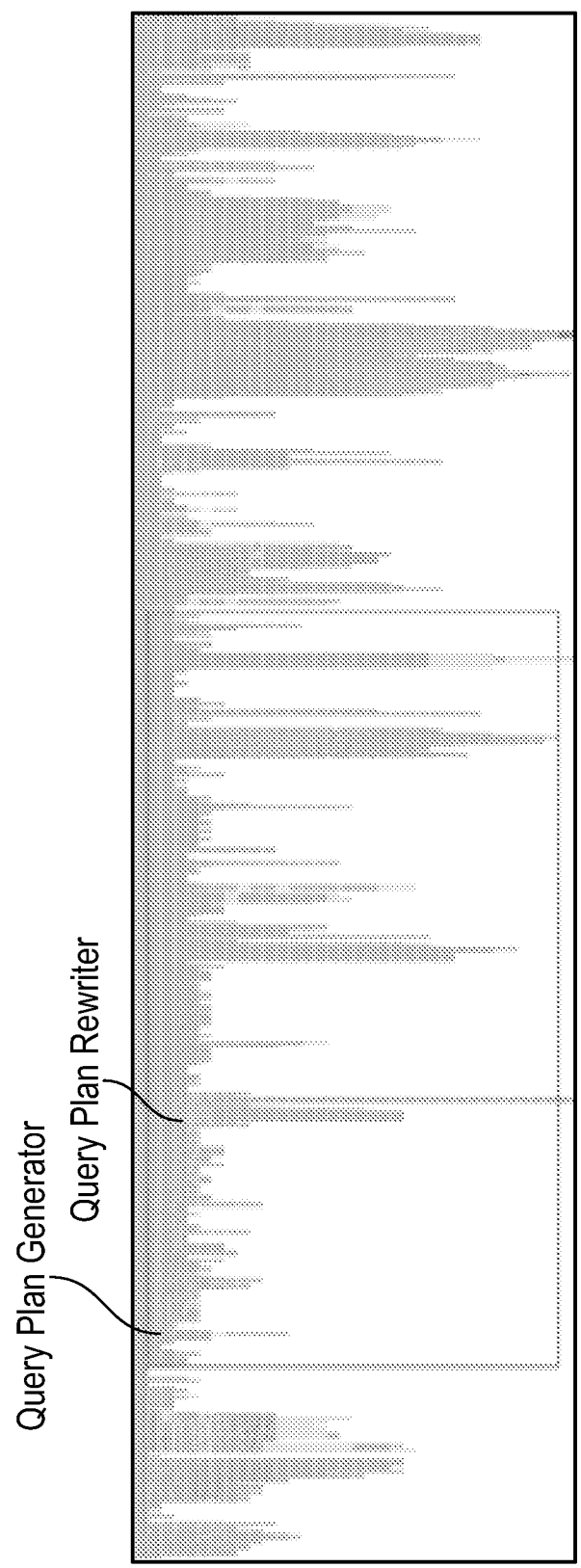
FIG. 4 illustrates an example of a JFR (Java Flight Recorder) profile for a compilation of a select query on a single table.

These stages and rewrite rules can be time consuming. For example, with respect to HTAP queries, which evaluate using predicates on a table, the compiler can spend almost half of compilation time for query plan optimization. FIG. 4 illustrates an example of a JFR (Java Flight Recorder) profile for a compilation of an example query on a single table. As outlined in the box, the query plan generator and its successor query plan rewriter consume about 48% of samples collected in this statement compile method.

Some stages and rewrite rules can target specific properties such as join, window function, subquery, etc. However, some conventional query compilers can blindly run all stages and apply rewrite rules regardless of whether the query execution plan would benefit from them (e.g., regardless of query properties). For example, a query compiler can run join implementation stages when the query plan does not contain multiple tables or join constructs. This can lead to inefficiencies, such as unnecessary time spent in query compilation.

Next, techniques for dynamic query compilation are described. As described in further detail below, an all-purpose (general) query compiler can receive different types of queries and can dynamically modify its procedures based on query properties. The compiler, using the techniques described herein, can generate a substantially identical execution plan when the compiler skips or modifies specified rewrite and compilation stages. If certain query plan nodes or expressions do not exist in the initial query plan or in the revised query plan under optimization, the compiler can save time by skipping or modifying select stages and rewrite rules without a full traversal of query plan nodes and their expressions.

A compute service manager, as described herein, can receive a query and collect information associated with the query, such as query type, query properties, etc., when constructing the initial query plan before the compiler performs optimization stages and applies rewrite rules. The compiler may then dynamically select which optimization stages to perform and which rewrite rules to apply based on the collected information, which can lead to skipping select (e.g., unnecessary or non-optimal) stages and rewrite rules. Notably, the skipping or modification of stages or rewrite rules should not affect the execution of the query because the query plan does not have the nodes that can be targets of the skipped or modified stages and rewrite rules.

Figure 5:
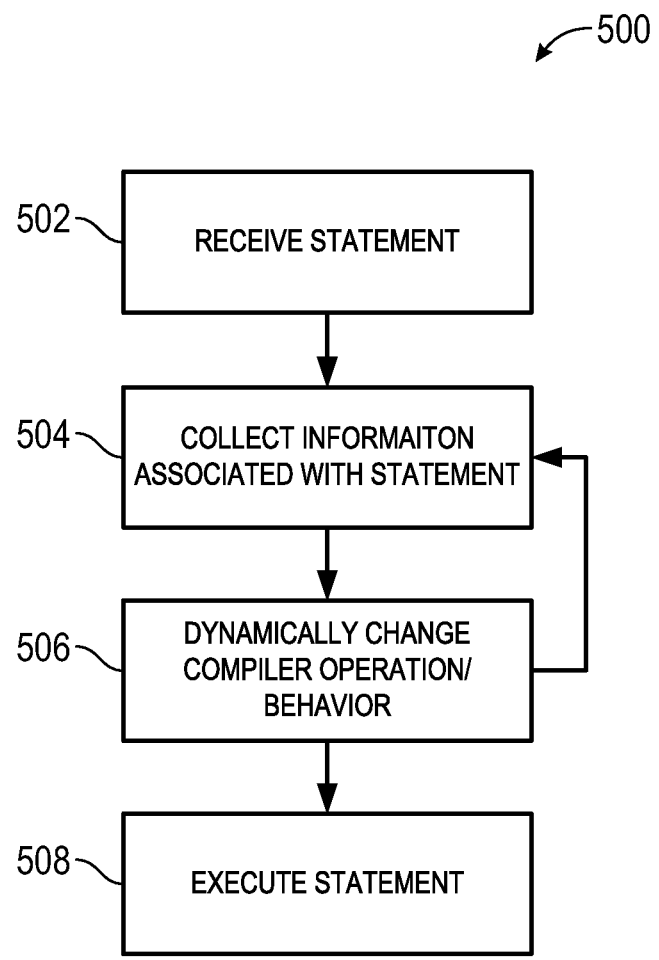
FIG. 5 illustrates a flow diagram of a method for dynamic compilation, according to some example embodiments.

FIG. 5 illustrates a flow diagram of a method 500 for dynamic compilation, according to some example embodiments. At operation 502, a statement to be executed is received by a compute service manager. The statement can be a query, a DML statement, or the like.

At operation 504, a compiler in the compute service manager may collect information associated with the statement. For example, the compiler may collect information, such as query type, feature set (e.g., external table reference, subquery, user defined function (UDF) inclusion, types of table(s) indicated), and queryproperties. For example, as described in further detail below, an initial query plan may be generated and query properties pertaining to the initial query plan may be collected by gathering a list of classes (e.g., SqlExpression classes) referenced in the initial query plan by traversing the nodes in the plan. SqlExpression includes base call of expressions, which evaluate to a value in the parse tree and the query plan. These types of objects can be created during different steps of compilation.

At operation 506, the compiler may dynamically change its operation and behavior based on the collected information to generate a revised execution plan (e.g., revised query plan). For example, the compiler may skip selected stages and/or rewrite rules based on the collected information if those selected stages and/or rewrite rules are determined to be not applicable to the statement execution. For certain query types, some stages and/or rewrite rules may not be applicable and therefore skipped without affecting the outcome of the query execution.

At operation 508, the revised execution plan may be assigned to and executed by one or more XPs.

Figure 6:
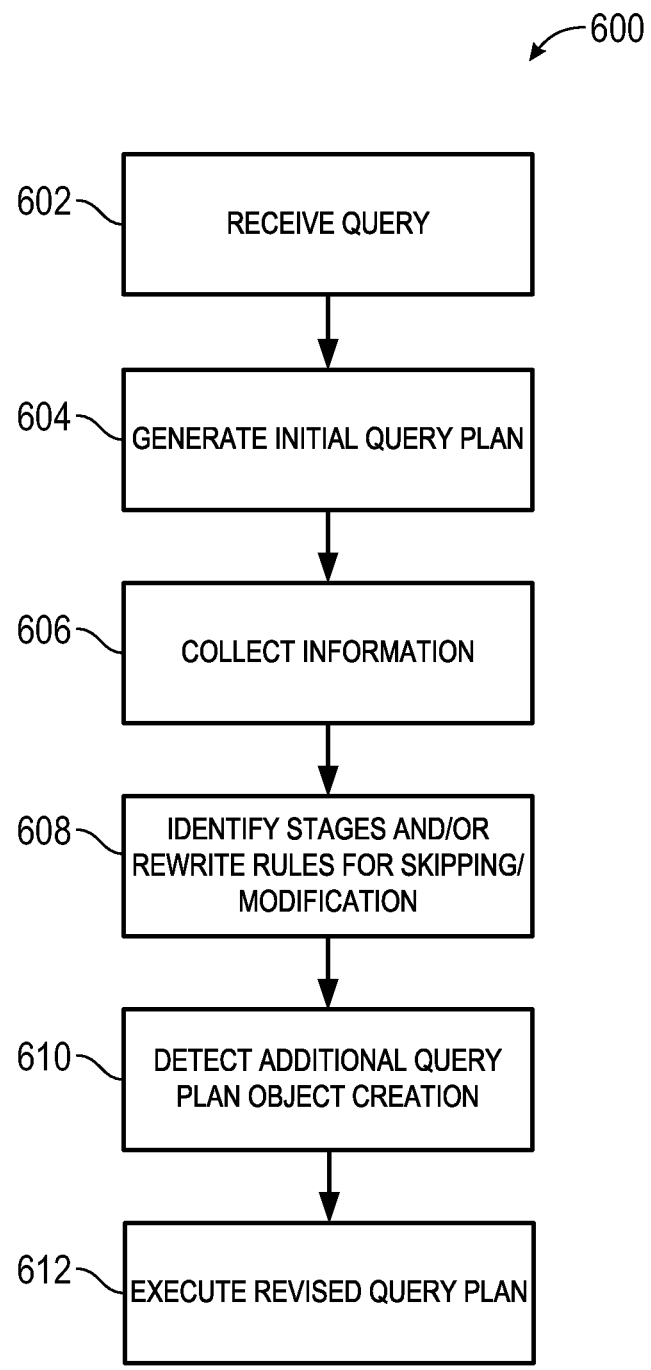
FIG. 6 illustrates a flow diagram of a method for dynamic query compilation, according to some example embodiments.

FIG. 6 illustrates a flow diagram of a method 600 for dynamic query compilation, according to some example embodiments. At operation 602, a query is received by a compute service manager.

At operation 604, a compiler in the compute service manager may generate an initial query plan. The initial query plan may be provided in the form of a JSON representation of an execution plan, which includes a representation of an execution graph, such as a query plan node, where each node describes a specific operation to be executed. A query plan node is a base class of nodes in the query plan translated from a parse tree after type is performed during compilation.

At operation 606, information, such as query type and query properties, may be collected. Query properties are a unique set of query plan node subclasses and SQLexpression subclasses owned by the query plan during compilation. An initial query plan can be created during an information collection stage. During this stage, an initial query property list can be gathered by collecting a list of SQLExpression classes referenced in the query plan by traversing the nodes in the initial query plan. Regarding the query plan node subclasses, they can be collected during the constructor of query plan node and its subclasses. Super classes of the object being created in the constructor can be added (except the base class query plan node). As described in further detail below, the initial query property list is maintained, and new class objects can be added since new class objects can be created in subsequent stages and rewrite rules.

At operation 608, select stages and/or rewrite rules may be identified as being eligible for skipping or modification. For example, the initial query property list may be compared to pre-defined class(es) for each stage, and if there is no match, that stage may be skipped. The compiler can skip the identified stage by rejecting its push to the compilation stack. Likewise, the initial query property list may be compared to pre-defined class(es) for each rewrite rule, and if there is no match, that rewrite rule may be skipped.

In some embodiments, identifying eligible rewrite rules for skipping can be performed using rewrite rule definitions. Some rewrite rules can use a rewrite bind as a building block of a pattern tree. If a rewrite rule is created using a rewrite bind with matching class, it means that the rule does not match if the query plan does not include the input matching classes. Since the query properties already includes the list of referred type of query plan nodes, this can be extended with the rule matching logic by comparing the list of matching classes of rewrite bind of the rewrite rule to the query properties of an input query plan before it traverses the query plan using rewriter visitor.

Some rewrite rules may not be dependent on the specific type of query plan nodes but depend on the SqlExpressions. In order to check if the SqlExpression exists or if a new SqlExpression is created during rewrite steps, the compiler can keep track of creation of a specific type of SqlExpression subclass objects. The scope of collected SqlExpression subclasses to specific subclasses can be limited. The limits, for example, can be used to skip optimization related to subquery unnesting, window function rewrites, and group-by/distinct, aggregation replacements. In some embodiments, the collected SqlExpression subclasses may be limited to: SqlSubQueryExpression (for subquery usage), SqlWindowFunction (for window function usage), SqlFunction containing SqlFunctionProperty.AGGREGATE (for aggregate usage).

The skipped stages and/or rewrite rules should not significantly impact query execution. The query property, which can include a set of QueryPlanNode subclasses and SqlExpression subclasses owned by the input query plan, can be used to make sure that the query plan is simple and there is no change in the query plan after the optimization is applied. For SqlExpression subclass constructors and QueryPlanNode subclass constructors to register their class type to the query property, the property list can be maintained inside CompilerContext so that those can be collected before the initial query plan is created.

Compilation stages may be classified as mandatory or optional stages. Mandatory stages cannot be skipped. Optional stages may be skipped if they are determined to be inapplicable to the current query. Optional stages may be feature or statement-type specific, and these can be skipped if they are determined to be inapplicable to the current query. Optional stages may be related to query construct, such as related to subquery, schema specific, and if they are determined to be inapplicable to the current query.

Optional stages may also include optimization stages. Optimization stages can be skipped if they are determined to be inapplicable to the current query. Additionally or alternatively, optimization stages may be skipped even if they can be applied but where their application would not result in more efficient processing. For example, if it is determined that the time spent executing an optimization stage is greater than the savings from the optimization stage, that optimization stage may be skipped. For example, an optimization stage may attempt to remove extra expressions. However, this optimization stage execution may consume a significant amount of time if there are a large number of expressions (e.g., projection operators) to check and remove. Therefore, if it is determined that the cost of performing the optimization stage, using threshold values and the like, outweighs the benefit from performing the optimization stage, then that optimization stage may be skipped or modified.

At operation 610, as the compilation moves through stages, the compiler may detect if additional query plan objects have been created by the executed stages and/or rewrite rules. Let's consider an example: compiler generates an initial query plan from the following SQL statement:

select value from t1, t2
where t1.id=t2.id and t1.id+t2.id>3

Figure 7A:
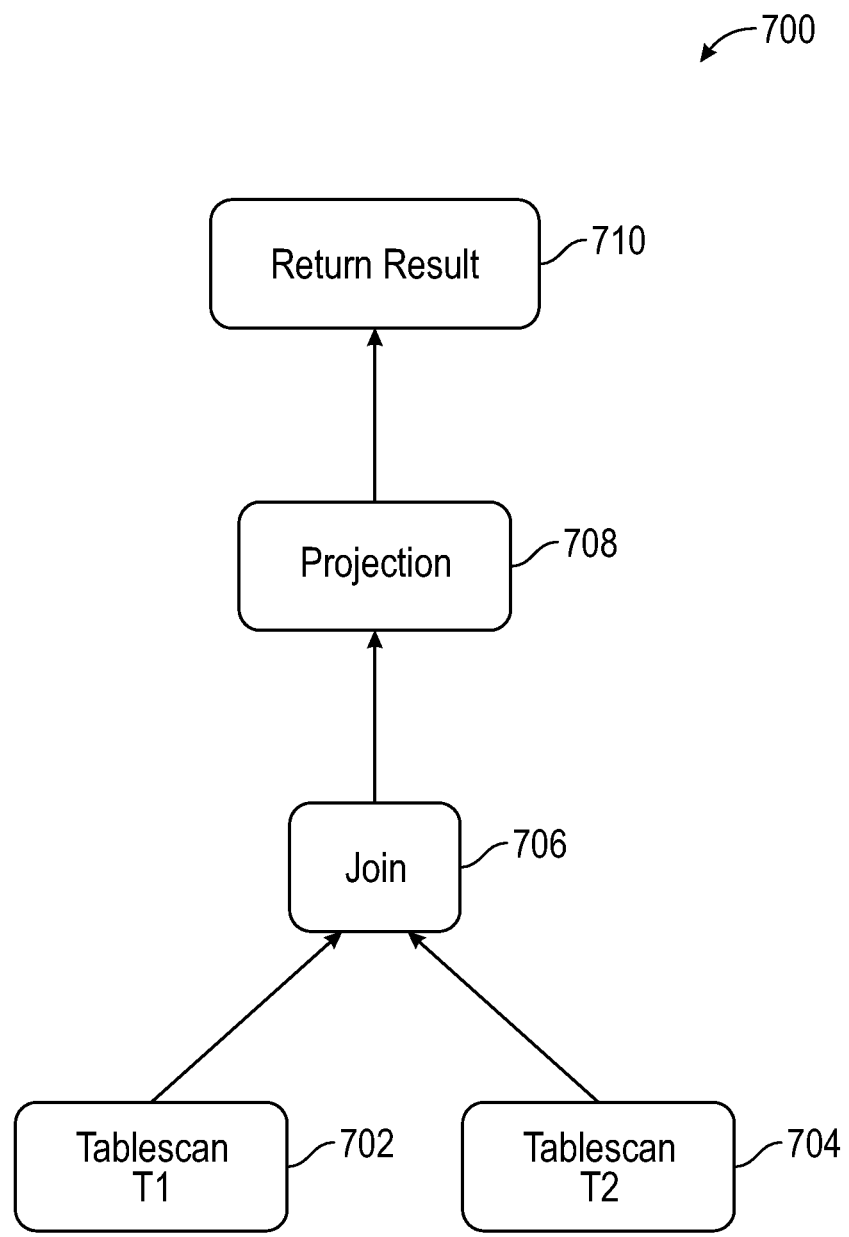
FIG. 7A illustrates an example of an initial query plan graph.

FIG. 7A illustrates an example of the initial query plan graph 700 for the query. The graph may be generated after query block transformation as described above. For simplicity, SqlExpression classes are omitted. The initial query plan graph 700 can include the following operations: tablescan t1 702, tablescan t2 704, join 706, projection 708, and return result 710. Accordingly, the initial query property list contains at least the following classes:

NodeReturnResult
Projection
Join
TableScan

Figure 7B:
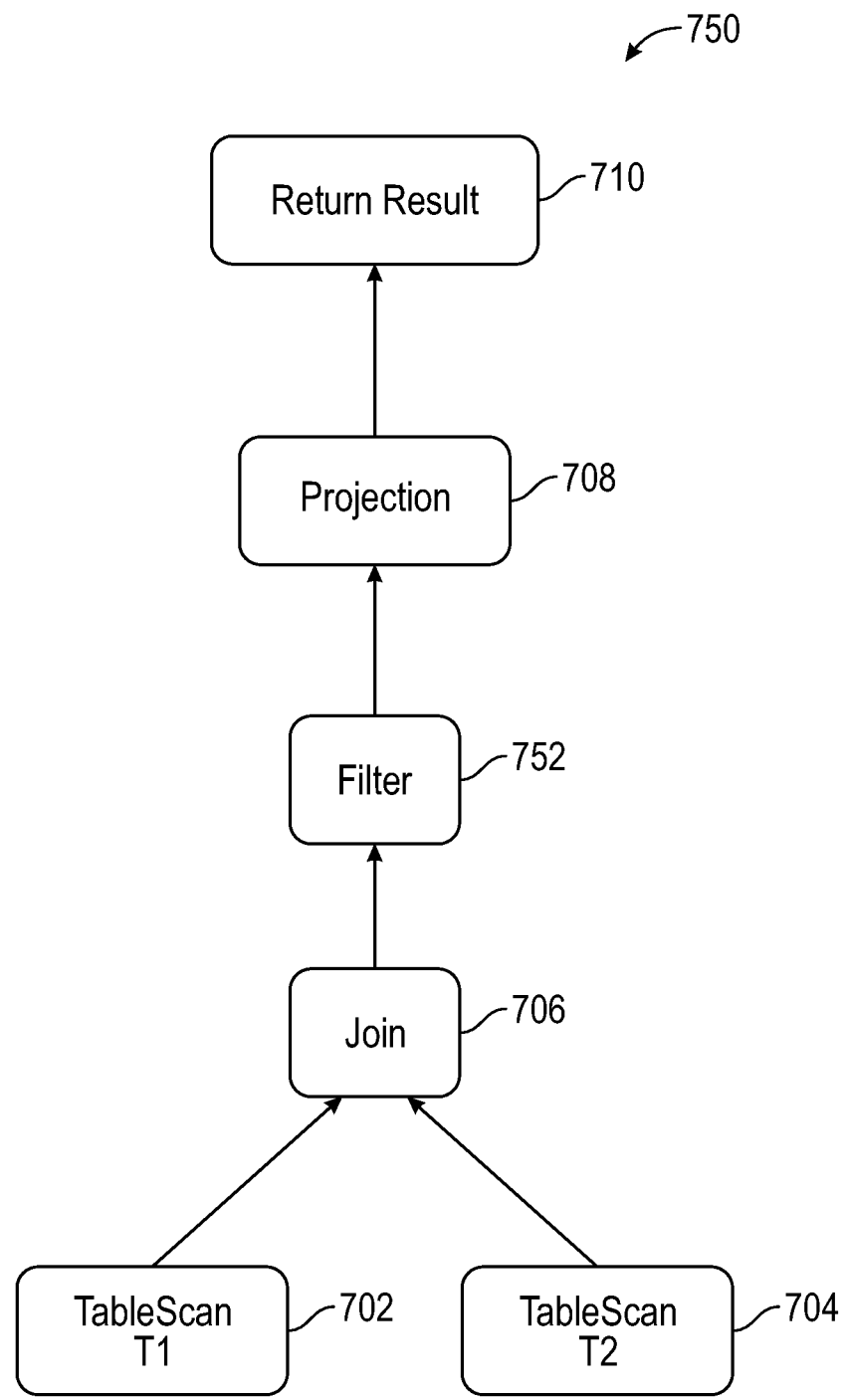
FIG. 7B illustrates an example of a revised query plan graph.

Consider, the compiler applies a rewrite predicate pull up rule, which creates a new query plan node filter by pulling the filter up from the query plan join node. FIG. 7B illustrates an example of a revised query plan graph 750. The revised query plan graph 750 includes the tablescan t1 702, tablescan t2 704, join 706, projection 708, and return result 710 operations from the initial query plan graph 700, but also includes an additional filter 752 operation between the join 706 and projection 708 operations. Consequently, the query property list may be modified to add the "Filter" class. For subsequent stages and/or rewrite rules, the added class may be included in the comparison to determine whether those subsequent stages and/or rewrite rules can be skipped or modified.

Referring back to FIG. 6, at operation 612, the revised query plan may be assigned to and executed by one or more XPs after the specified compilation stages and/or rewrite rules have been skipped.

Rewrite rules may be skipped using the techniques described herein. Moreover, in some embodiments, rewrite rule creation can be skipped, which can conserve further memory and resource usage. Typically, rewrite rules are created and then matched to see if they are applicable to a query plan. For example, if a hundred rewrite rules are defined, the hundred rewrite rules may be created before they are matched for application. This creation of rewrite rules before matching can cause higher memory allocation, which can degrade compilation performance.

Figure 8:
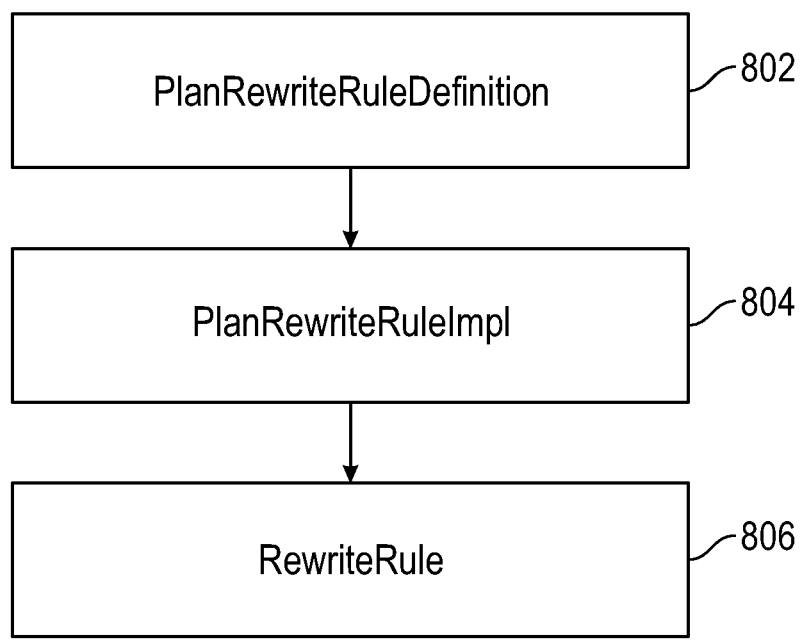
FIG. 8 shows a simplified block diagram of rewrite rule creation, according to some example embodiments.

FIG. 8 shows a simplified block diagram of rewrite rule creation, according to some example embodiments. The inputs are the query plan node tree and a set of plan rewrite rules, and the output of the rewrite rule creation is a transformed query plan node tree after application of matched rewrite rules. At block 802, a plan rewrite rule definition class (PlanRewriteRuleDefinition) may be provided. For example, a library of rewrite rule definitions may be defined at a registry (e.g., PlanRewriteRuleRegistry).

At block 804, a plan rewrite rule implementation class may be provided. The plan write rule implementation can include a plurality of components. A create rule component (createRule( )) can define the pattern or shape of tree for the respective rewrite rule, and output a shape of tree based on the respective rewrite rule. A precondition check component (checkPrecondition( )) can check if specified attributes and logic are met to apply the respective rewrite rule. A rule implementation component (implementRule( )) can apply transformation and return an output tree. A class matching component (getClassToMatch( )) can return a list of query plan node types in the matched pattern of query plan node tree.

At block 806, a rewrite rule class may be provided. Here, the matched rewrite rules may be created. For example, a SQL node head may be created with an internal representation of the matching condition. A SQL node body may be created with an internal representation of the rule body (e.g., rewritten tree). Having the class matching being performed in the plan rewrite rule implementation class instead of after the rewrite rule creation can conserve significant memory allocation overhead.

Figure 9:
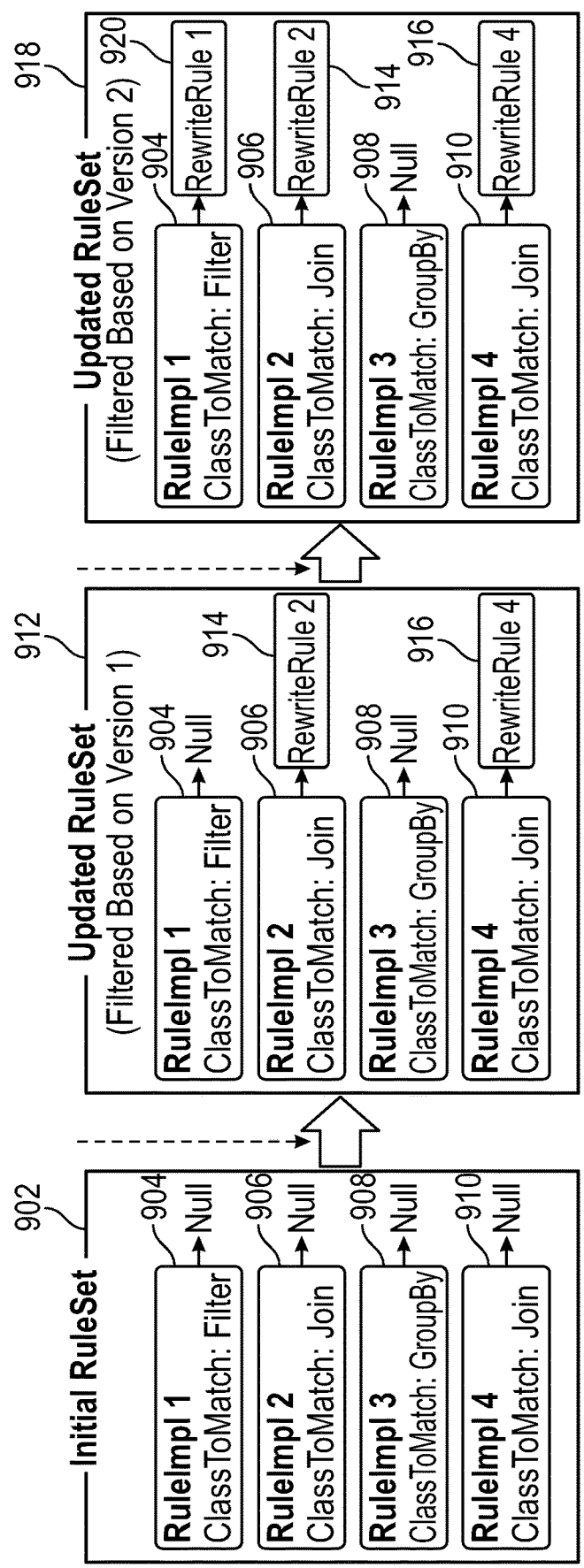
FIG. 9 shows an example of rewrite rule matching and creation.

FIG. 9 shows an example of rewrite rule matching and creation, according to some example embodiments. An initial rule set 902 is provided. The initial rule set may include rule implementation class objects only, and no rewrite rule instances as described above. Here, four rule implementation class objects are provided. A RuleImpl 1 object 904 is provided with the class to match as a filter operation. A RuleImpl 2 object 906 is provided with the class to match as a join operation. RuleImpl 3 object 908 is provided with the class to match as a group by operation. RuleImpl 4 object 910 is provided with the class to match as a join operation. Initially, the rule implementation class objects are set to null because they are unmatched.

Query properties may be inputted to determine which rule implementation class objects can be matched. For example, query properties version 1 may be provided as including the following operations: table scan, join, abstract projection, and return result.

An updated rule set 912 can be provided based on the query properties version 1. Here, the RuleImpl 2 object 906 and the RuleImpl 4 object 910 were matched because on the query properties version 1 including a join operation, while the RuleImpl 1 object 904 and the RuleImpl 3 were 908 not matched. Based on the matching, RewriteRule 2 instance 914 and RewriteRule 4 instance 916 may be created.

The query properties may change, and a new version 2 may be created. The query properties version 2 may include the version 1 operation of table scan, join, abstract projection, and return result, and may now include an additional filter operation.

An updated rule set 918 can be provided on the query properties version 1. The updated rule set 920 can now include a Rewrite Rule 920 instance because of the matching of the filter operation. The rewrite rule instances can then be applied to the query plan tree.

The skipped stages and/or re-write rules should not significantly impact query execution. In some embodiments, a verification step can be added to ensure that skipping a stage or rewrite rule do not adversely impact query execution because of, for example, side effects. There can be unknown side effects of optimization that are not supposed to occur but do occur unintentionally, which the query plan eventually works out without errors. The compiler can check whether the skippable optimization steps contain side effects. Verification mode can be a query compilation mode that generates the query property but does not skip optimization steps. Instead of skipping, it can be checked whether there is a change in the plan by the skippable optimization step.

When verification mode is enabled for the skippable stages, the compiler can still skip stages, but additionally can calculate and compare the plan before and after the optimization stages. The two-plan hashes should be the same if the stage can be skippable since it should not change any expressions and query plan nodes. Different plan hash means that something in the plan changed, indicating something in the plan changed in between. A similar check can be performed for skippable rewrite rules.

Some compiler visitor implementations can provide the functionality to stop traversal of an entire tree, but they generally do not have a feature to skip traversing a specific node and its descendent nodes. This mode can be useful to the visitor where it tries to push down some properties from top to bottom as far as it can go. If the push down stops at the node that prevents further pushdown to its child nodes, the visitor does not need to visit the children. For example, limit pushdown and filter pushdown can leverage this visitor mode.

Figure 10:
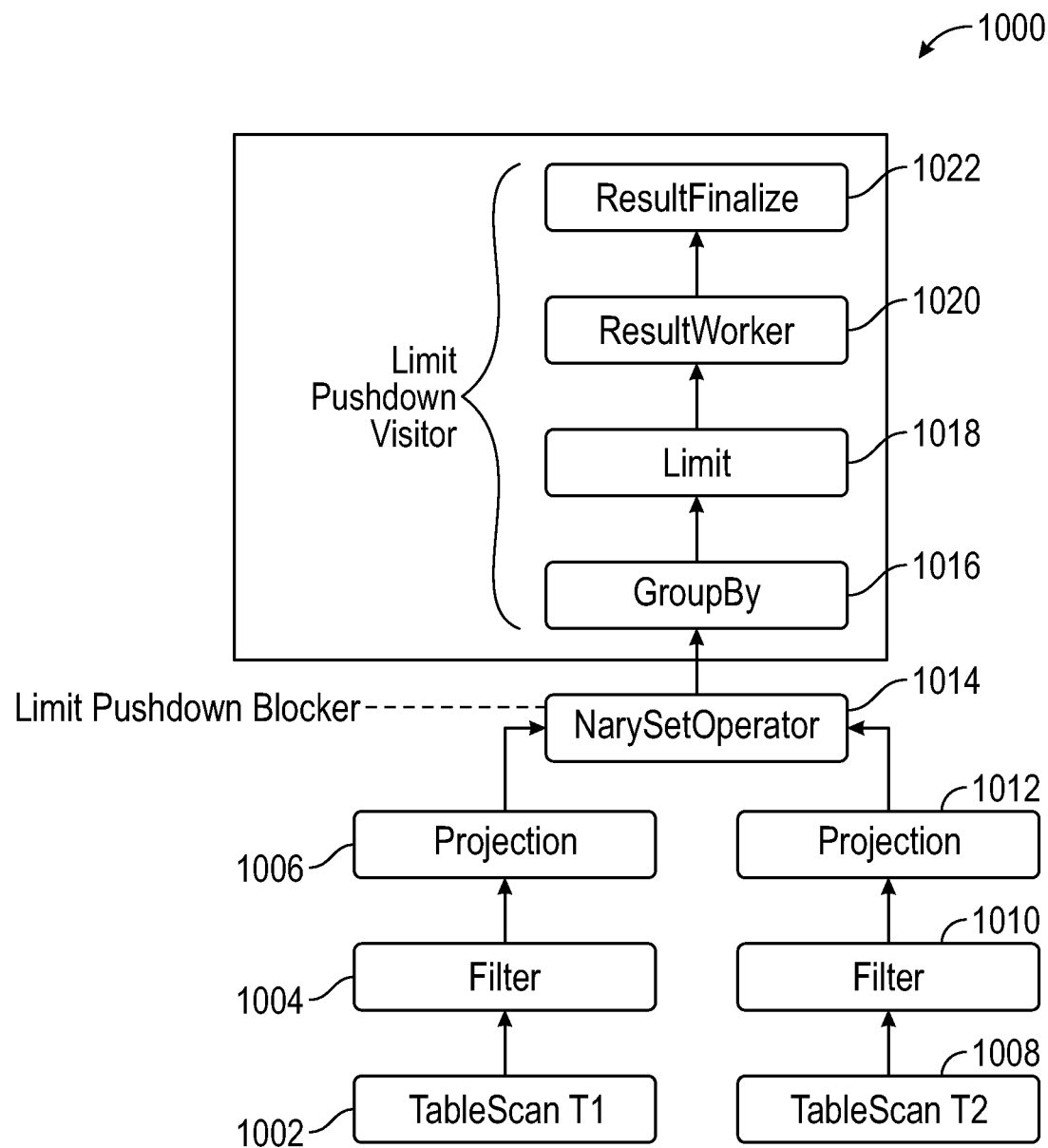
FIG. 10 shows an example of a limit pushdown visitor in a query plan, according to some example embodiments.

FIG. 10 shows an example of a limit pushdown visitor in a query plan 1000, according to some example embodiments. The query plan 1000 includes a first branch with operations including tablescan t1 1002, filter 1004, and projection 1006. The query plan 1000 includes a second branch with operations including tablescan t2 1008, filter 1010, and projection 1012. The query plan 1000 also includes a nary set operation 1014 above the two projection operations 1006, 1012, followed by other operations including group by 1016, limit 1018, result worker 1020, and result finalize 1022. Here, the nary set operator 1014 may be identified as a limit pushdown blocker, and the limit pushdown blocker can stop visiting child nodes under the blocker operator, such as the operations in the first and second branches.

The dynamic compilation techniques described herein can lead to resource and time savings. By skipping or modifying stages and/or rewrite rules, resources can be saved by not allocating memory for a skipped stage or rewrite rule (i.e., save memory allocation cost). Moreover, computational resources can be saved. For example, to apply a rewrite rule, the compiler receives a query plan node and scan nodes one-by-one to see if the rule applies, so skipping the rewrite rule can lead to significant computational as well as time savings.

Figure 11:
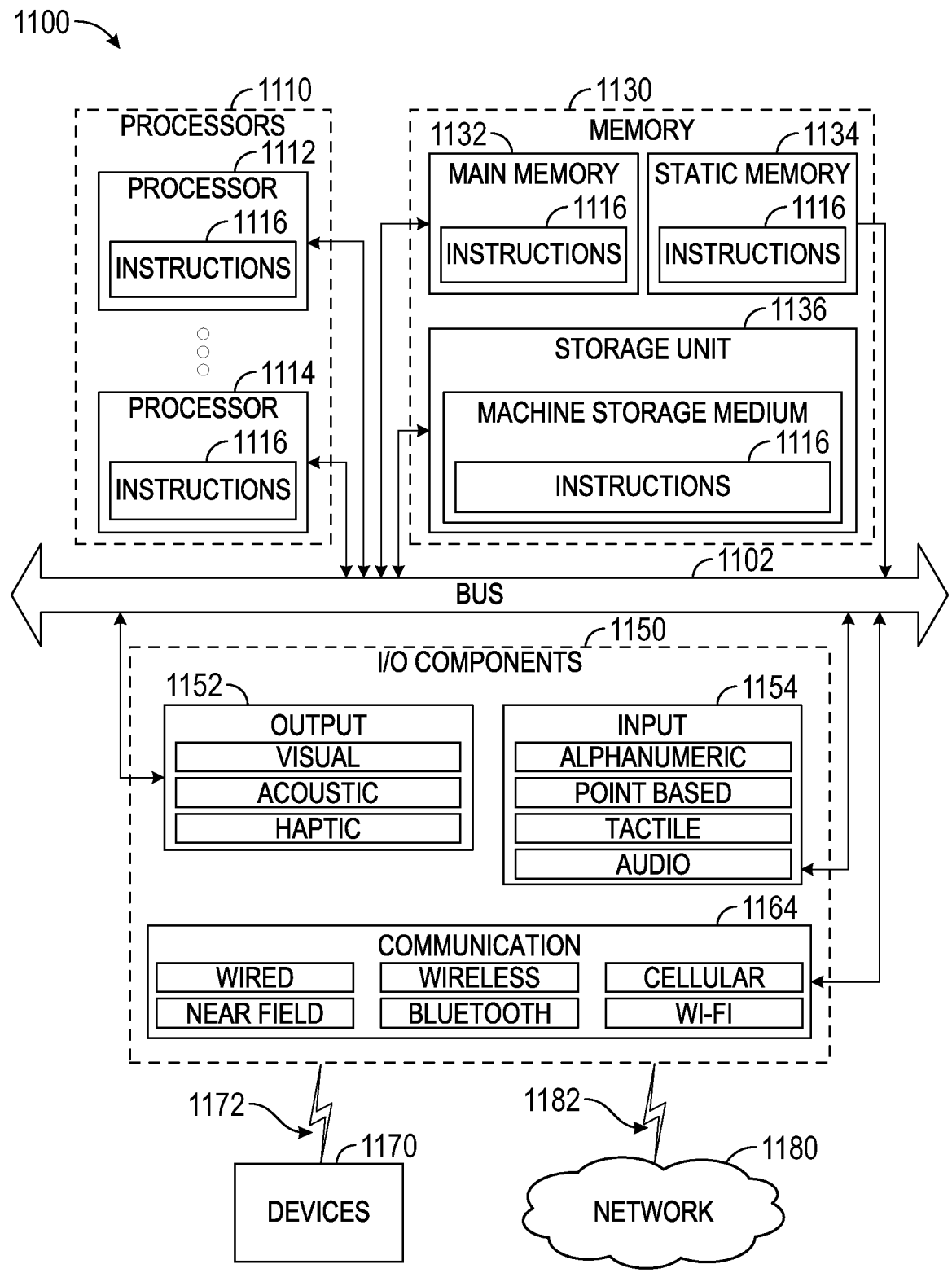
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described herein. As another example, the instructions 1116 may cause the machine 1100 to implement portions of the data flows described herein. In this way, the instructions 1116 transform a general, non-programmed machine into a particular machine 1100 (e.g., the remote computing device 106, the access management system 110, the compute service manager 112, the execution platform 114, the access management system 118, the Web proxy 120) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the remote computing device 106, the access management system 118, the compute service manager 112, the execution platform 114, the Web proxy 120, and the devices 1170 may include any other of these systems and devices.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving a query; generating, by at least one hardware processor, an initial query plan to execute the query; retrieving query properties based on the initial query plan; identifying at least one compilation stage to skip based on the query properties; generating a revised query plan, the revised query plan not including the at least one compilation stage; and executing the query using the revised query plan.

Example 2. The method of example 1, further comprising: comparing the query properties to a set of pre-defined classes associated with the at least one compilation stage for identifying the at least one compilation stage to skip.

Example 3. The method of any of examples 1-2, further comprising: detecting at least one additional query plan object being created during compilation of the revised query plan; and adding the at least one additional query plan object to the query properties.

Example 4. The method of any of examples 1-3, wherein the at least one compilation stage is a first compilation stage, the method further comprising: identifying a second compilation stage based on the at least one additional query plan object in the query properties; and compiling remaining portion of the revised query plan, the revised query plan not including the second compilation stage.

Example 5. The method of any of examples 1-4, further comprising: identifying at least one rewrite rule to skip based on the query properties, wherein the revised query plan does not include the at least one rewrite rule.

Example 6. The method of any of examples 1-5, further comprising: providing a library of rewrite rule definitions; providing a plan rewrite rule representation based on the library of rewrite rule definitions, including class matching component; matching a first class associated with a first rewrite rule to the query properties; not matching a second class associated with a second rewrite rule to the query properties; and creating the first rewrite rule to include in the revised query plan, wherein the second rewrite rule is the at least one rewrite rule to skip and is not created.

Example 7. The method of any of examples 1-6, further comprising: assigning the revised query plan to a one or more execution platforms for execution.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
receiving a query;
generating, by at least one hardware processor, an initial query plan to execute the query;
retrieving query properties based on the initial query plan, the query properties comprising a list of classes referenced in the initial query plan retrieved by traversing nodes in the query plan;
identifying at least one compilation stage to skip based on comparing the list of classes to a set of pre-defined classes associated with the at least one compilation stage, the identifying at least compilation stage comprises:
determining a computing cost of performing the at least compilation stage;

determining a computing savings of performing the at least compilation stage;

comparing the computing cost of performing the at least compilation stage and the computing savings of performing the at least compilation stage; and identifying the at least compilation stage to skip based on comparing the computing cost of performing the at least compilation stage and the computing savings of performing the at least compilation stage;

generating a revised query plan, the revised query plan not including the at least one compilation stage; and executing the query using the revised query plan.

2. The method of claim 1, further comprising:

detecting at least one additional query plan object being created during compilation of the revised query plan; and adding the at least one additional query plan object to the query properties.

3. The method of claim 2, wherein the at least one compilation stage is a first compilation stage, the method further comprising:

identifying a second compilation stage based on the at least one additional query plan object in the query properties; and compiling remaining portion of the revised query plan, the revised query plan not including the second compilation stage.

4. The method of claim 1, further comprising:

identifying at least one rewrite rule to skip based on the query properties, wherein the revised query plan does not include the at least one rewrite rule.

5. The method of claim 4, further comprising:

providing a library of rewrite rule definitions;

providing a plan rewrite rule representation based on the library of rewrite rule definitions, including class matching component;

matching a first class associated with a first rewrite rule to the query properties;

not matching a second class associated with a second rewrite rule to the query properties; and creating the first rewrite rule to include in the revised query plan, wherein the second rewrite rule is the at least one rewrite rule to skip and is not created.

6. The method of claim 1, further comprising:

assigning the revised query plan to a one or more execution platforms for execution.

7. A machine-storage medium embodying instructions that, when executed by a machine, cause the machine to perform operations comprising:

receiving a query;

generating, by at least one hardware processor, an initial query plan to execute the query;

retrieving query properties based on the initial query plan, the query properties comprising a list of classes referenced in the initial query plan retrieved by traversing nodes in the query plan;

identifying at least one compilation stage to skip based on comparing the list of classes to a set of pre-defined classes associated with the at least one compilation stage, the identifying at least compilation stage comprises:

determining a computing cost of performing the at least compilation stage;

determining a computing savings of performing the at least compilation stage;

comparing the computing cost of performing the at least compilation stage and the computing savings of performing the at least compilation stage; and identifying the at least compilation stage to skip based on comparing the computing cost of performing the at least compilation stage and the computing savings of performing the at least compilation stage;

generating a revised query plan, the revised query plan not including the at least one compilation stage; and executing the query using the revised query plan.

8. The machine-storage medium of claim 7, further comprising:

detecting at least one additional query plan object being created during compilation of the revised query plan; and adding the at least one additional query plan object to the query properties.

9. The machine-storage medium of claim 8, wherein the at least one compilation stage is a first compilation stage, the machine-storage medium further comprising:

identifying a second compilation stage based on the at least one additional query plan object in the query properties; and compiling remaining portion of the revised query plan, the revised query plan not including the second compilation stage.

10. The machine-storage medium of claim 7, further comprising:

identifying at least one rewrite rule to skip based on the query properties, wherein the revised query plan does not include the at least one rewrite rule.

11. The machine-storage medium of claim 10, further comprising:

providing a library of rewrite rule definitions;

providing a plan rewrite rule representation based on the library of rewrite rule definitions, including class matching component;

matching a first class associated with a first rewrite rule to the query properties;

not matching a second class associated with a second rewrite rule to the query properties; and creating the first rewrite rule to include in the revised query plan, wherein the second rewrite rule is the at least one rewrite rule to skip and is not created.

12. The machine-storage medium of claim 7, further comprising:

assigning the revised query plan to a one or more execution platforms for execution.

13. A system comprising:

at least one hardware processor; and at least one memory storing instructions that, when executed by the at least one hardware processor, cause the at least one hardware processor to perform operations comprising:

receiving a query;

generating, by at least one hardware processor, an initial query plan to execute the query;

retrieving query properties based on the initial query plan, the query properties comprising a list of classes referenced in the initial query plan retrieved by traversing nodes in the query plan;

identifying at least one compilation stage to skip based on comparing the list of classes to a set of pre-defined classes associated with the at least one compilation stage, the identifying at least compilation stage comprises:

determining a computing cost of performing the at least compilation stage;

determining a computing savings of performing the at least compilation stage;

comparing the computing cost of performing the at least compilation stage and the computing savings of performing the at least compilation stage; and identifying the at least compilation stage to skip based on comparing the computing cost of performing the at least compilation stage and the computing savings of performing the at least compilation stage;

generating a revised query plan, the revised query plan not including the at least one compilation stage; and executing the query using the revised query plan.

14. The system of claim 13, the operations further comprising:

detecting at least one additional query plan object being created during compilation of the revised query plan; and adding the at least one additional query plan object to the query properties.

15. The system of claim 14, wherein the at least one compilation stage is a first compilation stage, the operations further comprising:

identifying a second compilation stage based on the at least one additional query plan object in the query properties; and compiling remaining portion of the revised query plan, the revised query plan not including the second compilation stage.

16. The system of claim 13, the operations further comprising:

identifying at least one rewrite rule to skip based on the query properties, wherein the revised query plan does not include the at least one rewrite rule.

17. The system of claim 16, the operations further comprising:

providing a library of rewrite rule definitions;

providing a plan rewrite rule representation based on the library of rewrite rule definitions, including class matching component;

matching a first class associated with a first rewrite rule to the query properties;

not matching a second class associated with a second rewrite rule to the query properties; and creating the first rewrite rule to include in the revised query plan, wherein the second rewrite rule is the at least one rewrite rule to skip and is not created.

18. The system of claim 1, the operations further comprising:

assigning the revised query plan to a one or more execution platforms for execution.

* * * * *